United States Patent [19]

Bush

[11] Patent Number: 4,797,987

[45] Date of Patent: Jan. 17, 1989

[54] METHOD OF ASSEMBLING A BEAD LOCK DEVICE AND PNEUMATIC TIRE

[75] Inventor: John W. Bush, Roseville, Mich.

[73] Assignee: The Budd Company, Troy, Mich.

[21] Appl. No.: 53,276

[22] Filed: May 22, 1987

Related U.S. Application Data

[62] Division of Ser. No. 772,006, Sep. 3, 1985, Pat. No. 4,674,549.

[51] Int. Cl.[4] .............................................. B23P 19/04
[52] U.S. Cl. ...................................... 29/433; 29/453; 29/525.1
[58] Field of Search ............. 29/433, 437, 453, 526 R; 152/158, 400, 401

[56] References Cited

U.S. PATENT DOCUMENTS

| | | | |
|---|---|---|---|
| 495,277 | 4/1983 | Stillman | 152/400 |
| 507,090 | 10/1893 | Owen | 152/400 X |
| 1,140,752 | 5/1915 | Leonard | 152/401 X |
| 2,381,382 | 8/1945 | Hale | 152/400 |
| 2,523,695 | 9/1950 | Greene | 152/400 |
| 2,856,978 | 10/1958 | Mullins | 152/400 X |
| 3,381,355 | 5/1968 | Bixby | 29/433 X |
| 3,834,005 | 9/1974 | Johnson | 29/433 |
| 4,159,730 | 7/1979 | Osada et al. | 152/158 |
| 4,293,016 | 10/1981 | Bible et al. | 152/158 |
| 4,372,365 | 2/1983 | Osada et al. | 152/158 |

FOREIGN PATENT DOCUMENTS 555754  5/1943  United Kingdom ............... 152/401

Primary Examiner—Charlie T. Moon
Attorney, Agent, or Firm—Harness, Dickey & Pierce

[57] ABSTRACT

A bead lock device includes a plurality of bows and a frame for connecting the bows together to form an annular structure. The structure is placed in the interior of a tire which is placed onto a wheel. Wheel flanges compress the bows which, in turn, effectively lock the tire beads against the wheel flanges. A method of making a bead lock device by attaching bows onto a pair of flexible rods and joining the rods at their ends to form hoops is also disclosed.

14 Claims, 2 Drawing Sheets

METHOD OF ASSEMBLING A BEAD LOCK DEVICE AND PNEUMATIC TIRE

This is a division of U.S. patent application Ser. No. 772,006 filed Sept. 3, 1985 now U.S. Pat. No. 4,674,549.

TECHNICAL FIELD

This invention relates to bead locking devices for use in combination with pneumatic vehicle tires and, more particularly, to devices for holding the annular beads of the tire against the circumferential flanges of the wheel rim at low tire pressures.

BACKGROUND ART

The prior art bead locking devices teach the use of open structures, closed structures, and a combination of each, as well as pneumatic and mechanical sealing mechanisms. The prior art also teaches some form of cross member or run flat structure for supporting the tire during periods of low pressure. An open structure is one that has a space or gap between successive cross members. A closed structure is one in which the cross member is a continuous structure. A combination structure is a partially open and partially closed structure. A pneumatic seal uses air pressure to lock the tire bead in place. A mechanical seal uses a mechanical device to lock the tire bead in place.

The following groups of patents illustrate different bead-lock and run-flat devices. U.S. Pat. Nos. 1,324,944 issued to Watkins; 1,213,557 issued to Trotter; 4,157,107 issued to Cataldo; 4,233,713 issued to Ewing; 4,246,947 issued to Ewing; EPO 00020150 issued to Furusawa, and British Patent No. 1,305,383 issued to Gillett illustrate varying forms of an open structure run-flat device. U.S. Pat. Nos. 2,844,180 issued to Omeron; 3,838,836 issued to Bradley; 4,248,286 issued to Curtis; 4,293,016 issued to Bible; 4,401,144 issued to Wilde, and German Patent No. 2,648,919 issued to Lepper illustrate varying forms of a closed structure. U.S. Pat. Nos. 4,281,700 and 4,281,701 issued to Ross illustrate a form of combination run-flat and bead lock device. U.S. Pat. Nos. 4,153,095 issued to Sarkissian; 4,216,809 issued to Picksley; 4,246,948 and 4,262,724 issued to Sarkissian illustrate a pneumatic sealing bead-lock device. U.S. Pat. Nos. 2,053,545 issued to Girz and 4,216,810 issued to Osada illustrate a mechanical sealing bead-lock device.

The above-identified prior art patents teach run-flat and bead-lock devices have, however, several disadvantages. One disadvantage is the fact that many of them are made of heavy metallic materials, adding excessive inefficient weight in operation, as well as in handling. There are disadvantages in the use of pneumatic sealing devices as well. These devices are usually lighter than metallic devices but they can lose their air pressure just like the tires thereby effectively destroying their bead locking function. Moreover, they are generally somewhat complex structures and are not capable of easy repair.

Those skilled in the art may be aware of still other disadvantages in the use of the types of bead-lock and run-flat devices mentioned herein and commonly used in the field.

SUMMARY OF THE INVENTION

The present invention for use with a pneumatic vehicle tire having a pair of annular beads involves a bead-lock device, with the tire being supported on a wheel rim with outer circumferential flanges. The bead-lock device comprises a plurality of generally U-shaped flexible bows and a frame means for connecting the bows together to form a unitary annular structure about the circumference of the wheel. A portion of each bow extends outwardly in a radial direction from the rim. The opposite ends of each bow are positioned so that they are adjacent to the inner sides of the tire beads. The bows are compressed when the tire is assembled onto the wheel. This assembly creates an axial force in the bows which presses the bows against the tire beads toward the respective flanges of the wheel, thus securing the tire onto the wheel even under low pressure conditions.

Another aspect of the present invention is a method of assembling a bead locking device. Opposite ends of a plurality of generally U-shaped flexible bows are attached to a pair of flexible rods at spaced locations on the rods. Then the opposite ends of the rods are connected together to form a pair of hoops, each with a diameter slightly larger than the diameter of the wheel. The formed annular unitary structure is then inserted into a tire. When the tire, containing the present invention bead-lock, is assembled on the wheel rim, the axial spring force of the bows urge the tire beads against their respective wheel flanges thereby securing the tire onto the wheel.

The bows of the present invention are preferably made of fiber reinforced plastic using resins selected from the group of vinyl ester, polyester, epoxy, or the like-resins yielding high strength, lightweight characteristics. The present invention also provides an easily repairable and inexpensive device for efficiently and reliably securing pneumatic vehicle tires onto a wheel having lateral circumferential flanges.

BRIEF DESCRIPTION OF THE DRAWINGS

Other advantages of the present invention will become apparent to one skilled in the art upon reading the following specification and by reference to the drawings in which.

DESCRIPTION OF THE PREFERRED EMBODIMENTS

Figure 1:
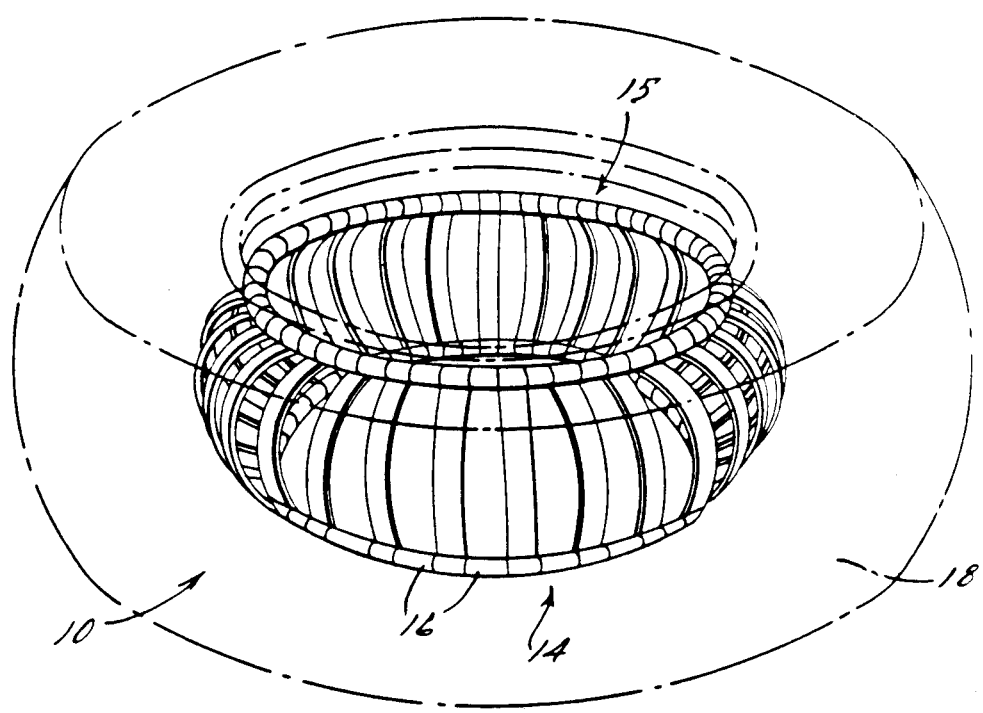
FIG. 1 is a perspective view of a bead lock device made in accordance with the present invention shown inside a tire.
Figure 2:
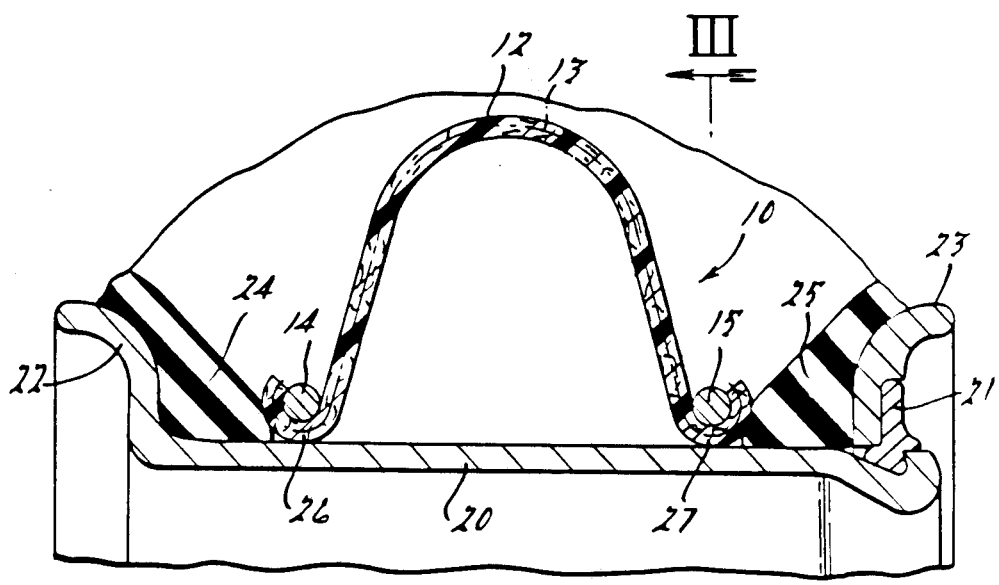
FIG. 2 is a cross-sectional view of the device of FIG. 1 shown mounted on a wheel.
Figure 3:
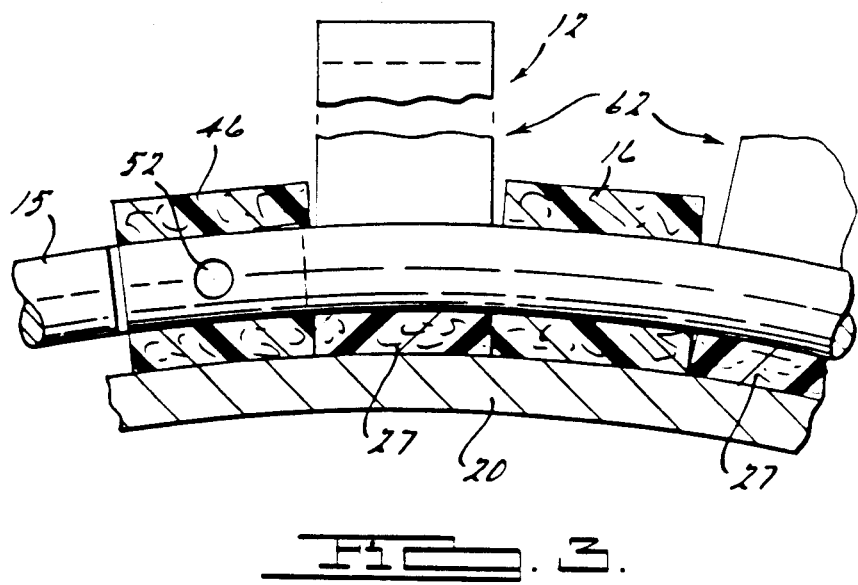
FIG. 3 is a partial cross-sectional view taken along the lines 3—3 of FIG. 2.
Figure 4:
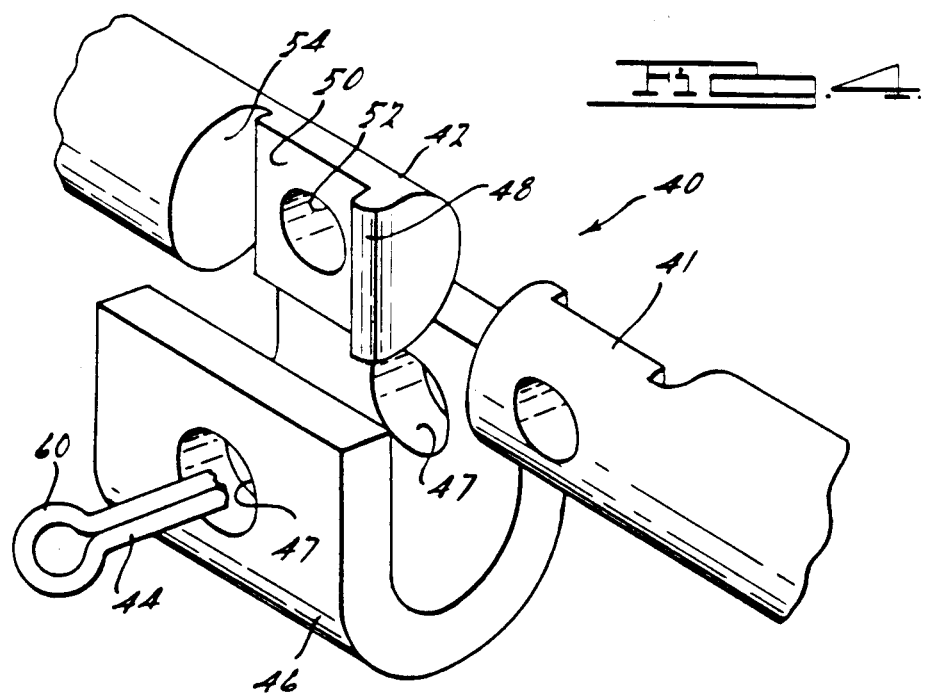
FIG. 4 is a partial perspective view of the connection of the frame.

With particular reference to FIGS. 1-3, the bead lock device 10 made in accordance with the teachings of the present invention has a plurality of bows 12 extending from a frame which, in this embodiment, is provided by a pair of hoops 14 and 15. Each bow 12 is positioned an equal distance from each successive bow 12 about the annular frame. A plurality of sleeves or collars 16 are positioned between each bow 12 forming a space or gap therebetween. The bead lock device 10 is shown in FIGS. 1 and 2 as positioned in a tire 18 which is mounted upon a wheel rim 20, and secured on the rim by a pair of lateral circumferential flanges 22 and 23. When assembled, the tire beads 24, 25 are compressed between the bead lock device 10 and the rim flanges 22, 23 thereby securing the tire 18 onto the wheel rim 20 even at low tire pressures.

As can be seen most clearly in FIG. 2, the bows 12 each have a U-shaped construction. Each bow's ends 26 and 27 are formed in a reversely curled configuration. These reversely curled ends 26, 27 or loops are threaded or snap fitted onto the hoops 14, 15 of the frame, respectively. The U-shaped bows 12 extend radially outward from the axis of the wheel assembly and thus may also serve as run flat devices.

The bows 12 are manufactured of a fiber reinforced plastic. The fiber is preferably glass and the matrix resin is preferably vinyl ester, polyester, epoxy or the like. Preferably, the glass fibers in the finished bows run continuously the length thereof (as illustrated diagrammatically by the phantom lines 13 in FIG. 2) to provide the bows with excellent lightweight mechanical strength properties while still being capable of flexing to provide the necessary spring force.

Each bow's U-shaped design enhances the sealing capabilities of the bead lock device 10. The bows 12, positioned on the wheel, exert an axial force upon the inner surface of the tire beads 24, 25. The stationary wheel rim flanges 22, 23 exert a reactive axial force to the axial force of the bows 12 thereby locking the tire beads between the bead lock device and the wheel rim flanges.

The configuration of the bow ends 26, 27 are such that they can be snapped or threaded onto the frame. The bows 12 may be loosely held on the frame or they may be held in place by a conventional fastener. The looped portion of the bow ends 26, 27 has an interior diameter approximately equal to the diameter of the frame hoops 14, 15. This enables the bow ends 26, 27 to be securely snapped or threaded onto the frame. This fit provides the bows 12 with slight rotation about the frame which enables the bows 12 to exert continual axial force against the tire beads 24.

The hoops 14, 15 making up the frame of the preferred embodiment each have a diameter slightly larger than the outside diameter of the wheel rim. Each hoop is preferably manufactured from fiber reinforced plastic, but it also can be made of aluminum, magnesium or the like-materials which possess high strength and lightweight properties. In addition, the hoops may be a wire cable or any suitable inner connecting link mechanism, such as a chain.

The hoops of the preferred construction can be made by joining together the ends of suitable lengths of flexible rods. For example, connector assembly 40 shown in FIG. 44 can be used for this purpose.

The connector assembly 40 employs a fastener 44 and a collar 46 to join the rod ends 41, 42 together to form each loop. The rod ends 41, 42 are formed with complementary step configurations for securing the ends together. A first step 48 is formed on the terminal portion of the rod end. A second step 50, adjacent to the first step 48, has an aperture 52 for passage of a fastener to secure the ends 41, 42 together. A third step 54, adjacent to the second step 50, is indented and has the complementary shape of the first step 48. The rod ends 41, 42 are interlockingly positioned upon one another, so that the second step apertures 52 are coaxial and the first step 48 of one rod end is positioned in the third step 54 of the other rod end. A fastener 44, such as a cotter pin, is used to join the two frame ends 42 together. The collar 46 of the connector assembly has a pair of coaxial apertures 47 through its surface, as will be described in detail below. The apertures 47 enable the fastener heads 60 to be housed in the collar 46 and prevents the projection of the fastener head 60 out of the device 10.

Collars 16 are positioned between successive bows 12. Each collar 16 provides a gap between the successive bows 12. The gap 62 between the successive bows 12 is equally spaced. The collars 16 are preferably manufactured from plastic, metal, reinforced fiber resins, or the like-materials which exert high strength and lightweight characteristics. The collar 16 is a tubular member with an inside diameter approximately equal to the outside cross-sectional diameter of the hoop so that it can be threaded onto the hoop between the bows 12.

The bead lock device is assembled by placing the bows 12 and collars 16 onto the unjoined rods. The collars 16 are threaded onto the frame 14. If the bows 12 are threaded onto the frame 14, the collars 16 will be threaded onto the hoop rods before and after each bow 12. If the bows 12 are snap fitted onto the frame 14, a predetermined number of collars 16 are threaded onto the hoop rods prior to the snapping on of the bows 12. The bows 12 then are snap fitted to the hoop rods between the collars 16. The ends 41, 42 of the rods are then interlocked and the apertures 47 of special collar 46 are positioned coaxially with the apertures 52 in the ends of the rods. Fastener 44 is then passed through apertures 47, 52 for securing the rods together to form hoops 14, 15 and complete the construction of the bead lock device 10. The collar 46 of the connector assembly has substantially the same thickness and width as the other collars 16. Consequently, the connection of the rods blends in with the outline of the remaining structural components.

The bead lock device 10 is then ready to be placed into a pneumatic vehicle tire. The tire beads 24 are pried open either by manual force or by conventional pneumatic tire spreaders. With the beads 24 spread, the bead lock device 10 may be inserted into the tire 18 as a completed structure or in a coiled configuration where the hoop ends have not been connected. In the latter case, stops (not shown) should be placed on the rod ends 41, 42 to prevent the bows 12 and collars 16 from sliding off. One end of the partially assembled device is threaded into the interior of the tire 18, with a portion of the device remaining outside of the tire 18 being in a helical pattern. The helical portion remaining outside of the tire 18 is gradually threaded into the tire 18 until the rod ends 42 come together. Then, rod ends 41, 42 are secured together with the connector assembly forming the completed bead lock device 10, as described herein.

When multiple frame portions are positioned into a tire 18, stops are placed on all rod ends for the purpose of holding the bows 12 and spacers 16 in place. The multiple sections are positioned in the interior of the tire 18. The various rod ends are then fastened together forming the completed bead lock device 10 as shown in FIG. 1.

The tire 18, with the assembled bead lock device 10 in its interior, is then ready to be placed onto wheel 20. Generally, the wheel 20 has one stationary flange 22 and a second removable flange 23 held in place by a suitable ring 21. With the flange 23 removed, the tire 18 and device 10 within it are slid into wheel 20. Then, the flange 23 is pressed down onto the subassembly and the ring 21 is locked into place. In the assembled condition shown in FIG. 2, the bows 12 are axially compressed and serve as springs acting to hold the beads 24, 25 against the wheel flanges 22, 23, respectively.

While this invention has been described in connection with one particular example, modifications may well occur to the skilled practitioner upon a study of the specification, drawings and following claims.

I claim:

1. A method of making a bead lock device for a pneumatic tire to be mounted on a wheel of a given diameter having outer flanges, said method comprising:
   providing a plurality of general U-shaped flexible bows with reverse curl means at each end and a pair of flexible rods, attaching said reverse curl means of said plurality of generally U-shaped flexible bows to spaced locations on said pair of flexible rods, and joining opposite ends of said rods together to form hoops having a diameter slightly larger than the diameter of the wheel thereby providing an annular structure.

2. The method of claim 1 which further comprises inserting the said structure into a tire and compressing the bows when the tire is assembled onto the wheel whereby the bows urge the beads against the wheel flanges.

3. The method of claim 1 further comprising the step of threading spacers onto the hoops between successive U-shaped bows to form substantially equal space between the bows.

4. The method of claim 1 further comprising the step of snapping the opposite ends of the plurality of bows onto the flexible rods between successive spacers.

5. The method of claim 2 further comprising the step of threading the U-shaped bows onto the flexible rods between successive spacers.

6. A method for making a bead lock device for a pneumatic tire to be mounted on a wheel of a given diameter having outer flanges said method comprising:
   providing a plurality of flexible bows with reverse curl means at each end and a frame means,
   attaching said reverse curl means of said flexible arcuate bows to said frame means such that said frame means defines an opening enabling said frame means to be positioned about the circumference of the wheel with said flexible arcuate bows being inverted and extending radially outward from the wheel to provide an annular structure.

7. The method of claim 6 further comprising the step of inserting said structure into a tire and compressing the bows when the tire is assembled onto the wheel whereby the bows urge tire beads of the pneumatic tire against the wheel flanges.

8. The method of claim 6 wherein said bows are removable attached to said frame means.

9. The method of claim 6 further comprising the step of attaching spacers to said frame means between successive bows to form substantially equal space between the bows.

10. A method of assembling a pneumatic tire comprising:
    providing a pneumatic tire having mounting beads, a wheel on which said pneumatic tire is to be mounted, the wheel having flanges, a plurality of generally U-shaped flexible bows, and a pair of flexible rods,
    attaching opposite ends of said plurality of U-shaped flexible bows to spaced locations on said flexible rods;
    joining opposite ends of said rods together to form hoops having a diameter slightly larger than the diameter of said wheel to provide an annular structure;
    inserting said structure into said pneumatic tire; mounting said pneumatic tire with said structure onto said wheel; and
    compressing said bows when said tire is assembled onto said wheel whereby the bows urge the tire beads against the wheel flanges.

11. The method of claim 10 further comprising the step of threading spacers onto the hoops between successive U-shaped bows to form substantially equal spaces between the bows.

12. The method of claim 11 further comprising the step of snapping the opposite ends of the plurality of bows onto the flexible rods between successive spacers.

13. The method of claim 10 further comprising the step of threading the U-shaped bows onto the flexible rods between successive spacers.

14. The method of claim 10 wherein said bows are removeable attached to said frame means.

* * * * *